United States Patent [19]

Pfenninger

[11] 4,058,974

[45] Nov. 22, 1977

[54] COMBINED GAS/STEAM POWER PLANT WITH PRESSURIZED-GAS GENERATOR

[75] Inventor: Hans Pfenninger, Baden, Switzerland

[73] Assignee: BBC Brown Boveri & Company Limited, Baden, Switzerland

[21] Appl. No.: 665,796

[22] Filed: Mar. 11, 1976

[30] Foreign Application Priority Data

May 14, 1975 Switzerland .................. 6182/75

[51] Int. Cl.² ................ F02B 43/08; F02C 3/22
[52] U.S. Cl. .................. 60/39.12; 60/39.18 B
[58] Field of Search ........ 60/39.12, 39.18 R, 39.18 A, 60/39.18 B; 110/28 J; 122/4 D

[56] References Cited

U.S. PATENT DOCUMENTS

| | | | |
|---|---|---|---|
| 2,496,407 | 2/1956 | Pfenninger | 60/39.12 |
| 2,592,749 | 4/1952 | Sedillo et al. | 60/39.12; |
| 2,675,672 | 4/1954 | Schorner | 60/39.18 B |
| 3,704,586 | 12/1972 | Bruns | 60/39.12 |

*Primary Examiner*—Carlton R. Croyle
*Assistant Examiner*—L. J. Casaregola
*Attorney, Agent, or Firm*—Pierce, Scheffler & Parker

[57] ABSTRACT

A combined gas/steam power plant includes a gas turbine power set for delivering power such as for driving an electrical generator which comprises a combustion chamber, a gas turbine and a compressor driven by it, and a steam power plant comprising a steam generator and a steam turbine for delivering power such as for driving another electrical generator. Gas generators produce fuel gas for firing the combustion chamber and steam generator respectively. Independent charging groups, each comprising a gas turbine and compressor, are provided for the combustion chamber and steam generator respectively. Gasification air for generating the portion of fuel gas supplied to the combustion chamber is taken from the combustion air conveyed by the compressor of the gas turbine power set and compressed further in the compressor of the charging group allocated to the combustion chamber up to the pressure prevailing in the appertaining fuel gas generator. Gasification air for generating the portion of fuel gas supplied to the steam generator is compressed in the compressor of the other charging group allocated to the steam generator from ambient pressure up to the pressure prevailing in the appertaining fuel gas generator, and the two portions of the fuel gas are passed through the gas turbines of their respective charging groups and thence to the combustion chamber and steam generator. In addition, the steam generator, which is not supercharged, is connected directly to the outlet of the power delivering gas turbine.

4 Claims, 1 Drawing Figure

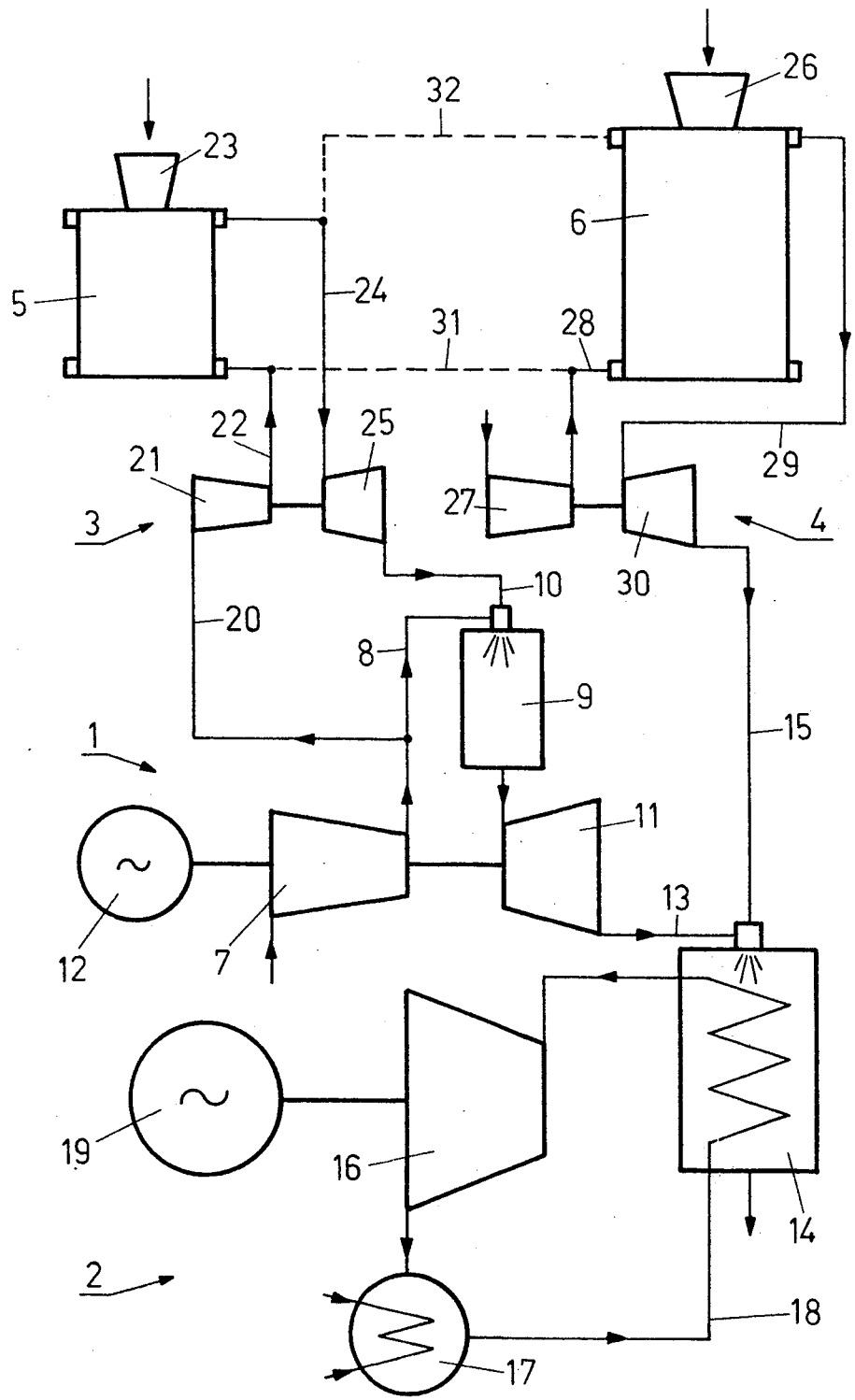

COMBINED GAS/STEAM POWER PLANT WITH PRESSURIZED-GAS GENERATOR

This invention concerns a combined gas/steam power plant consisting essentially of a gas-turbine power set which comprises at least one compressor, one combustion chamber and one gas turbine, to the exhaust end of the gas turbine there being connected a steam power plant incorporating at least one steam generator and one steam turbine, the combustion chamber and the stem generator being fired with fuel gas from at least one pressurized gas generator.

Combined power plants of the kind stated are generally operated with crude oil or natural gas. However, such a power plant is also known (Lurgi Quick Information, 0 1007/10.71) in which coal gasified in a pressurized gas generator is employed as the fuel. The charging group of the gas generator has two gas turbines, the respective flows to which are variable, but together consititute the total quantity of fuel gas, the two turbines driving the associated compressor and also an electric generator. One part of the fuel gas, following partial expansion in one of the gas turbines, passes into the combustion chamber of a gas turbine power set comprising the gas turbine, a compressor for supplying the combustion air, and an electric generator. The exhaust gases from this gas turbine power set are fed to a steam generator in which the other part of the fuel gas from the pressurized gas generator, having expanded virtually completely in the second gas turbine of the charging group, is heated, whereupon the exhaust gases from the gas turbine set serve as combustion air. The steam generated is admitted to a steam turbine which drives a further electric generator.

This power plant concept has various disadvantages: The total quantity of gasification air must be compressed from ambient pressure up to the full pressure in the gas generator, and therefore a high compressor capacity has to be provided in the charging group. As the charging group drives an electric generator, its speed cannot be varied. As far as can be seen, the quantity of gas generated can be regulated only by varying the proportions of fuel gas supplied to the two gas turbines of the charging group, one part being able to vary from 0 to 50% of the total quantity of gas, and the other part correspondingly from 100 to 50%. This does not seem to be very effective, however, as the total power generated in the two possible limiting cases varies by only 10%. Operation at relatively low partial loads is apparently not possible. The use of three electric generators cannot be considered the ideal case. In the gas turbine power set there is not only the combustion air, but also the respective part of the fuel gas, and these must expand together in the gas turbine. Since machines which operate at maximum output are generally used for gas turbine power sets, there is no possibility of employing a standard gas turbine power set. In view of the intake capacity of the maximum-output gas turbine, the compressor must be reduced in size accordingly, i.e. it must be specially designed.

The principal object of the invention is to avoid the disadvantages of the known type of installation and to create a combined power plant of this kind with a pressurized gas generator such that, above all, low partial loads are also possible, a maximum-output machine can be used for the gas turbine power set and the optimum efficiency of the whole power plant can be obtained.

This object is achieved in that compression of the gasification air for the pressurized gas generator takes place in at least two separate and independent charging groups each comprising a compressor and gas turbine, one such group being allocated each to the combustion chamber and to the steam generator, such that the gasification air needed to generate the proportion of fuel gas for the combustion chamber is taken from the combustion air conveyed by the compressor of the gas turbine power set and compressed further in the charging group allocated to the combustion chamber up to the pressure in the pressurized gas generator, while the gasification air necessary to generate the proportion of fuel gas for the steam generator is compressed in the corresponding charging group from ambient pressure to the pressure in the pressurized gas generator, and the two proportions of fuel gas, having given up energy in the gas turbines of their respective charging groups, flow to the combustion chamber and steam generator respectively.

Providing two separate charging groups, each of which operates at its own appropriate output, has the advantage that each can be regulated separately with regard to its throughput, and therefore operation at low partial loads is possible. Since the quantity of air needed to gasify the proportion of coal for the combustion chamber of the gas turbine is already compressed to the discharging pressure of the compressor of the gas turbine power set, the charging group is not required to produce the power for the first pressure stage. The charging group is thus much smaller and simpler. The air bled off for the gas generator, supplemented by the proportion for gasifying the coal, is again fed to the gas turbine of the gas turbine power set in which, therefore, the gas flow rate remains in equilibrium. What was extracted is returned again to the process, and there is nothing to prevent the use of a standard maximum-output machine.

A further advantage can be obtained with at least one compressed-gas generator each for the combustion chamber and the steam generator such that the pressurized gas generators operate at the same pressure level which can be varied with load. The same pressure level is achieved most reliably by connecting the two pressurized gas generators in parallel. A uniform pressure level is to be preferred if, in the event of reduced power demand, both electric generators are to operate at part load. In this case, too, it is possible to regulate both charging groups jointly with the same control signal, even though they are separate.

A further possibility is presented by the case of at least one pressurized gas generator each for the combustion chamber and the steam generator, such that the pressure levels of the pressurized gas generators are different and can be varied with load. With this configuration it is possible to operate the gas generator of the gas turbine power set, for example, at full load, while the gas generator for the steam generator runs at partial load when the power demand falls.

There are various possible methods of control, but it is most convenient if the speed of the charging groups can be varied. This can be achieved at less expense than a control system where the speed is held constant.

An example of a combined gas/steam power plant in accordance with the invention is explained in more detail below with reference to the accompanying schematic and simplified drawing.

As illustrated, the combined gas/steam power plant comprises the gas turbine power set 1, the steam power plant 2, the two charging groups 3, 4 and the two pressurized gas generators 5, 6. The compressor 7 of gas turbine power set 1 compresses ambient air to a first pressure stage, part of which is passed via the pressure pipeline 8 to the combustion chamber 9, to which a proportion of fuel i.e. producer gas flows via pipeline 10. The combustion gases created in the combustor 9 are fed to the gas turbine 11, where they expand and hence a large part of their thermal energy is converted into mechanical energy. The gas turbine 11 drives the compressor 7 and the electric generator 12.

The exhaust gases of the gas turbine 11 pass via pipeline 13 directly to the steam generator 14 of the steam power plant 2, where they serve as combustion air for the proportion of fuel i.e. producer gas flowing through pipeline 15. The generated steam is passed to the steam turbine 16, in which it expands and then condenses in condenser 17, whereupon the condensate passes back through pipeline 18 to the steam generator 14 for recycling. The steam turbine 16 drives electric generator 19.

From the pressure pipeline 8 there branches a pipeline 20 which leads to the compressor 21 of the charging group 3 in which this part of the air, already compressed in compressor 7, is still further compressed and then passed through pipeline 22 to the pressurized gas generator 5, where the coal to be gasified is introduced through lock 23. The resulting fuel i.e. producer gas flows through pipeline 24 to the gas turbine 25 of charging group 3, and is there expanded to the pressure in the combustion chamber 9, to which it then flows through pipeline 10. The compressor 21 is driven by the gas turbine 25.

The gasification air for the pressurized gas generator 6, into which the coal is introduced through lock 26, is compressed by the compressor 27 of charging group 4 from ambient pressure to the pressure in the gas generator 6, to which it flows by way of pipeline 28. The fuel i.e. producer gas flows from generator 6 through pipeline 29 to the gas turbine 30, which drives the compressor 27 of charging group 4. Having expanded almost completely it flows through pipeline 15 to the steam generator 14 for firing the latter.

The pressure in the gas generators 5 and 6 can be chosen to be the same or different. In the former case, the pipelines 31 and 32 indicated by broken lines can be provided which link the two pressurized gas generators on the air side and gas side, respectively, thus causing them to be connected in parallel.

The output of the whole power plant i.e. gas turbine power set 1 combined with the steam turbine power set 2 is regulated by varying the flow rate through one or both charging groups. Their speeds can then be kept constant by, for example, providing adjustable blades in the compressors and/or in the gas turbines of the charging groups. It is simpler, however, to adapt the speeds of the charging groups to the required load. This can be done in the usual manner with the aid of by-passes or throttle valves.

It also needs to be mentioned that the proportions of fuel gas for the combustion chamber and the steam generator can also be supplied by more than one gas generator each. Equally, more than one charging group each can be allocated to the combustion chamber and the steam generator.

I claim:

1. A combined gas-steam power plant comprising a gas turbine power set which includes a combustion chamber, a gas turbine for delivering power and a compressor driven thereby for delivering air to said combustion chamber, a steam turbine power set including a non-supercharged steam generator connected directly to the outlet from said gas turbine, and a steam turbine for delivering power, at least two pressurized gas generators for producing fuel gas for firing said combustion chamber and steam generator, respectively at least two separate and independent charging groups each comprising a gas turbine and a compressor driven thereby the gasification air required for generation of that portion of the fuel gas supplied to said combustion chamber being taken from the combustion air conveyed by the compressor of said gas turbine power set and compressed further in the compressor of one of said charging groups up to the pressure prevailing in one of said fuel generators, the gasification air required for generation of that portion of the fuel gas supplied to said steam generator being compressed in the compressor of the other charging group from ambient pressure to the pressure prevailing in the other fuel gas generator, and the said two proportions of the fuel gas produced respectively by said fuel gas generators being passed through the gas turbine of their respective charging groups and thence to said combustion chamber and steam generator, respectively.

2. A combined gas-steam power plant as defined in claim 1 wherein said pressurized fuel gas generators are operable at the same pressure level and which is variable with the load on the combined power plant.

3. A combined gas-steam power plant as defined in claim 2 wherein said pressurized fuel gas generators are interconnected on their air and gas sides respectively to operate in parallel.

4. A combined gas-steam power plant as defined in claim 1 wherein said pressurized fuel gas generators are operable at different pressure levels and which are variable with the load on the combined power plant.

* * * * *